United States Patent
Yenna et al.

(10) Patent No.: US 12,259,270 B2
(45) Date of Patent: Mar. 25, 2025

(54) LEVEL FORK PROTECTION SLEEVE

(71) Applicant: Endress+Hauser SE+Co. KG, Maulburg (DE)

(72) Inventors: Trevor Yenna, Greenwood, IN (US); Wesley York, Franklin, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 311 days.

(21) Appl. No.: 18/047,051

(22) Filed: Oct. 17, 2022

(65) Prior Publication Data
US 2024/0125639 A1  Apr. 18, 2024

(51) Int. Cl.
G01F 23/296 (2022.01)

(52) U.S. Cl.
CPC .................. G01F 23/2966 (2013.01)

(58) Field of Classification Search
None
See application file for complete search history.

(56) References Cited

U.S. PATENT DOCUMENTS

| | | | | |
|---|---|---|---|---|
| 2011/0001395 A1* | 1/2011 | Turner | .................. | G01N 11/16 29/25.35 |
| 2011/0012480 A1* | 1/2011 | Turner | .................. | B06B 1/0618 310/346 |
| 2012/0103088 A1* | 5/2012 | Urban | .................... | G01N 11/16 73/290 V |
| 2021/0207725 A1* | 7/2021 | Zähe | .................... | F15B 11/055 |

* cited by examiner

*Primary Examiner* — Patrick Assouad
*Assistant Examiner* — Mark A Shabman
(74) *Attorney, Agent, or Firm* — Mark A. Logan; Endress+Hauser (USA) Holding, Inc.

(57) ABSTRACT

A level fork protection sleeve includes a first cylinder and a second cylinder disposed within the first cylinder. The cylinders are joined together via a material bonding such as welding. A gap in the second cylinder along its length provides a channel within the sleeve for the ingress and egress of liquid media. The sleeve is embodied to fit onto a shaft of a vibronic limit level device and to extend over and protect the vibrating member of the limit level device.

4 Claims, 4 Drawing Sheets

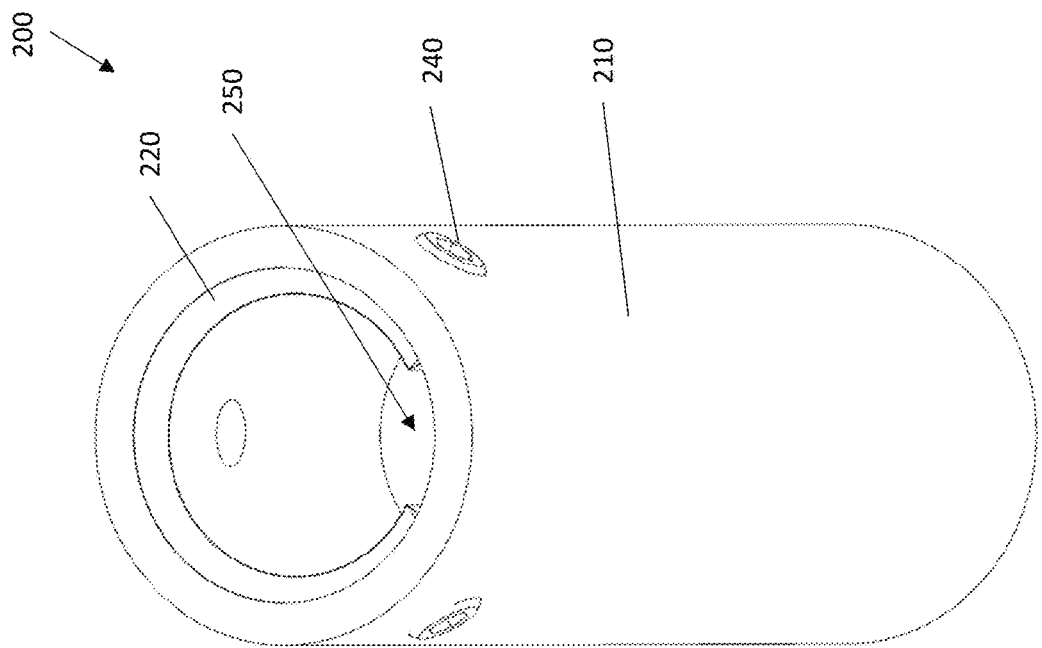
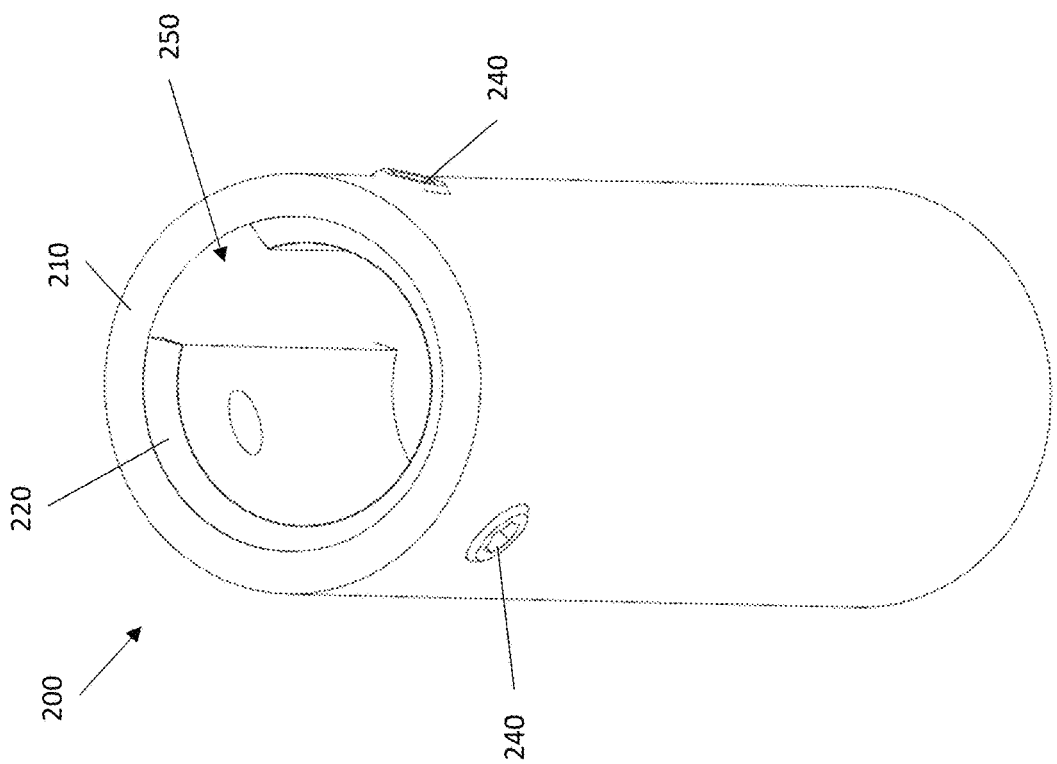
FIG. 3B
FIG. 3A

LEVEL FORK PROTECTION SLEEVE

TECHNICAL FIELD

The present disclosure relates generally to a sleeve embodied to protect a vibrating member of a limit level device.

BACKGROUND

A limit level device may be installed in a tank, pipe, or other vessel to determine when a fill substance—usually either a liquid or a bulk solid material—has filled in the tank, pipe, or vessel to the point where the limit level device is installed. A vibronic limit level device includes a member such as a membrane, rod, or tuning fork that is embodied to contact the liquid or bulk solid material in the tank, pipe, or vessel. The membrane, rod, or tuning fork (depending upon the particular embodiment of the vibronic limit level switch) is caused by the vibronic limit device to mechanically oscillate, and the vibronic limit level device detects that the fill level of the liquid or bulk solid material has reached the oscillating member when mechanical oscillations of the member differ from the oscillations driving that member. The change in the mechanical oscillations (e.g., resonant frequency, amplitude, phase) may be used by the vibronic limit level device to detect fill level as well as a viscosity and a density of a liquid fill material.

Because the oscillating member of the vibronic limit level device is placed within the tank, pipe, or vessel, the oscillating member may be contacted or even damaged by other things that may also be placed within the tank, pipe, or vessel. Therefore, a protecting sleeve extending over the vibrating rod or tuning fork may be used to protect that rod or tuning fork. Conventional protection sleeves for the vibronic limit level device have been very robust, but at a cost of an unnecessary complex design requiring many steps to manufacture. For example, conventional protection sleeves require the boring of a plurality of holes through the sleeve so that liquid media may flow to the vibrating member. Such adds time and cost to the manufacturing process of the sleeves.

SUMMARY

Accordingly, there remains a need for further contributions in this area of technology. According to at least one embodiment of the disclosure, a level fork protection sleeve comprises an outer cylinder having a first end and a second end; a partial inner cylinder defined by a major arc of at least 300 degrees, the inner cylinder having a first end and a second end; and a plurality of set-screws, wherein an inner diameter of the inner cylinder corresponds to an outer diameter of a shaft of a vibronic limit level device, and an inner diameter of the outer cylinder corresponds to an outer diameter of the inner cylinder, wherein a length of the outer cylinder is greater than a length of the inner cylinder, wherein the inner cylinder is disposed within the outer cylinder such that the first end of the inner cylinder is disposed at the first end of the outer cylinder, and the outer cylinder and the inner cylinder are materially bonded together, wherein a plurality of though-holes are disposed along the circumference of the outer cylinder and the inner cylinder at the first end of the respective cylinder, each of the plurality of through-holes extending through the outer and inner cylinders, and each of the plurality of the though-holes tapped with threads, wherein each of the plurality of set-screws is disposed in a corresponding through-hole, and wherein the sleeve is embodied to fit over a vibrating member of a vibronic limit level device.

In an embodiment of the level fork protection sleeve, the first cylinder and the second cylinder are stainless steel, and the material bonding is a welding of the second cylinder to the first cylinder.

In an embodiment of the level fork protection sleeve, the first end of the inner cylinder is inset from the first end of the outer cylinder allowing a weld joint at the first end of the inner cylinder welding the inner cylinder to the outer cylinder.

BRIEF DESCRIPTION OF THE DRAWINGS

FIGS. 3A and 3B show, from different perspectives, a view of the level fork protection sleeve according to an embodiment of the present disclosure.

DETAILED DESCRIPTION

Disclosed herein is a sleeve embodied to fit over and protect a vibrating member of a vibronic limit level device. Various embodiments of the disclosed device will now be presented in conjunction with the figures that illustrate the embodiments. It will be understood that no limitation of the scope of this disclosure is thereby intended. The vibrating member of the vibronic limit level device may be a fork, a rod, or a membrane.

Figure 1:
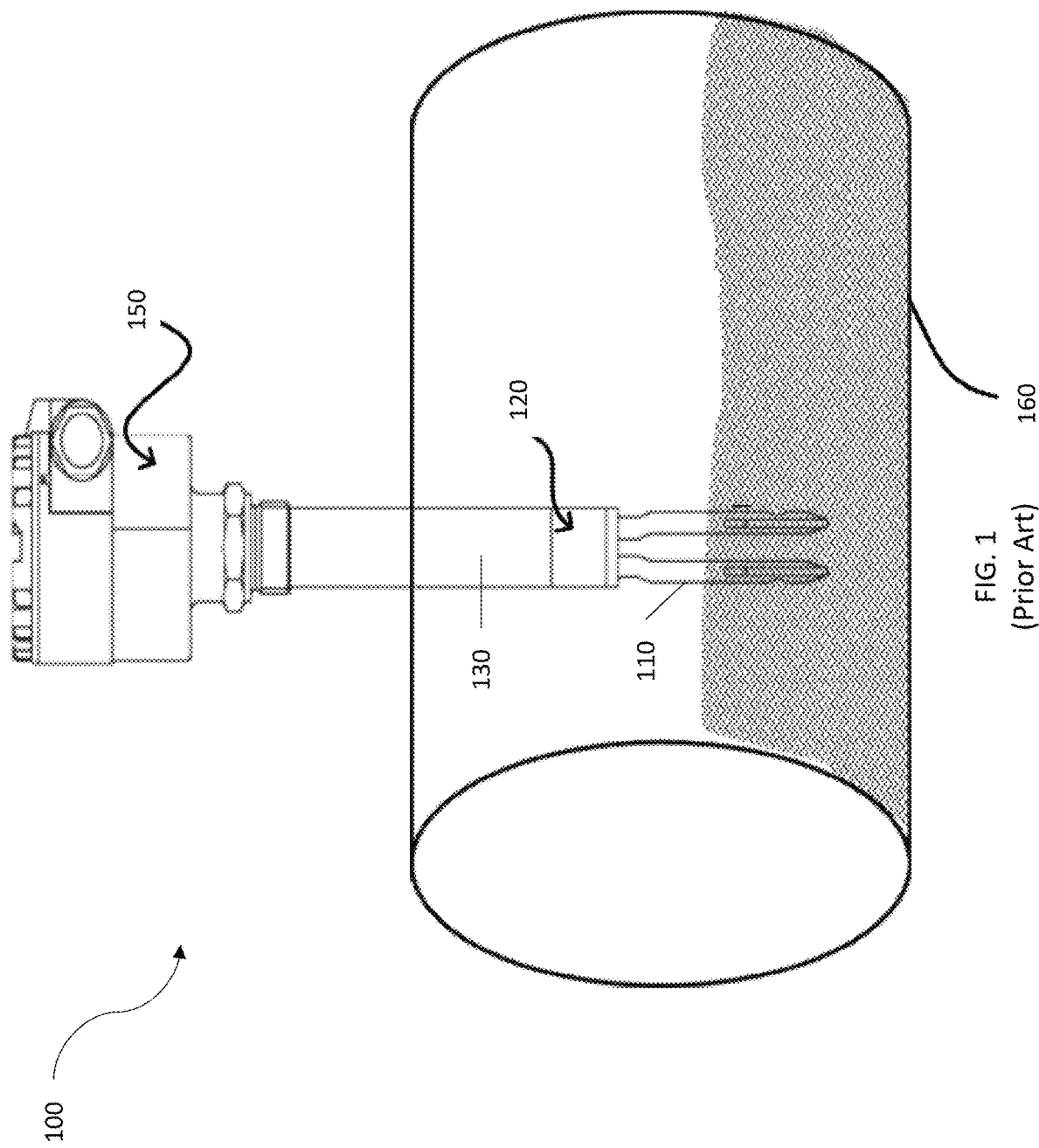
FIG. 1 shows a vibronic limit level device according to the state of the art.

FIG. 1 shows an embodiment of a vibronic limit level device 100 according to the state of the art. The limit level device 100 may include a vibrating member 110. Here the vibrating member 110 is embodied as a vibrating fork, although it may instead be a vibrating rod or a membrane. Disposed near the vibrating member 110 may be a driver 120 embodied to cause vibrations in the vibrating member 110. The driver 120 may be embodied as a piezoelectric vibrator or an inductive circuit. The limit level device 100 may further include a shaft 130 extending between the vibrating member 110 and a device housing 150. The shaft 130 is disposed to place the vibrating member 110 into a pipe or housing 160 where the vibrating member 110 may contact the medium. The shaft may also serve as a conduit for wires or other conductors connecting the driver to circuits within the housing.

Figure 2A:
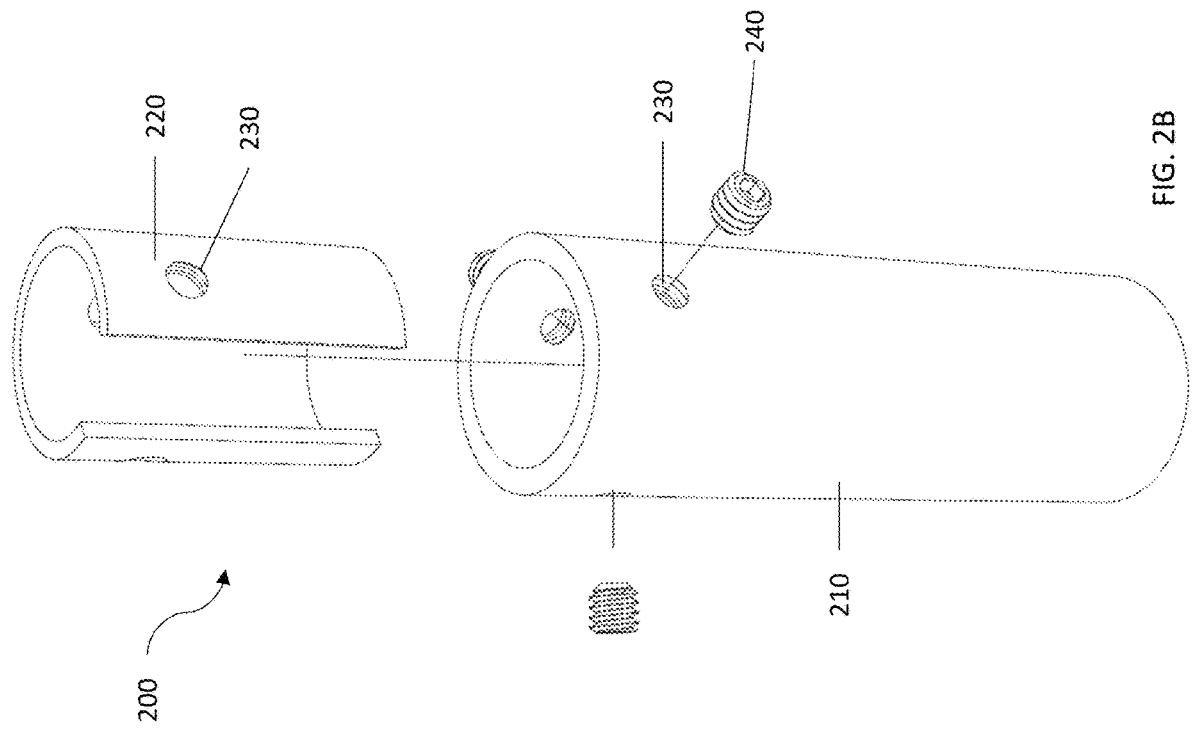
FIGS. 2A and 2B show, from different perspectives, an exploded view of the level fork protection sleeve according to an embodiment of the present disclosure.
Figure 2B:
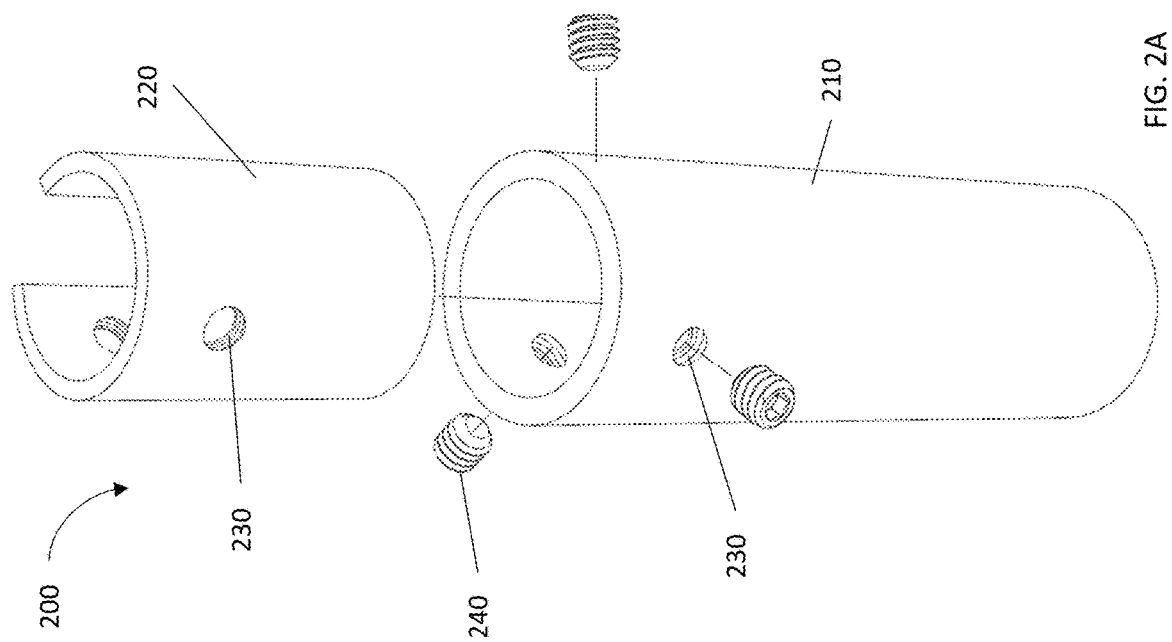
Figure 5:
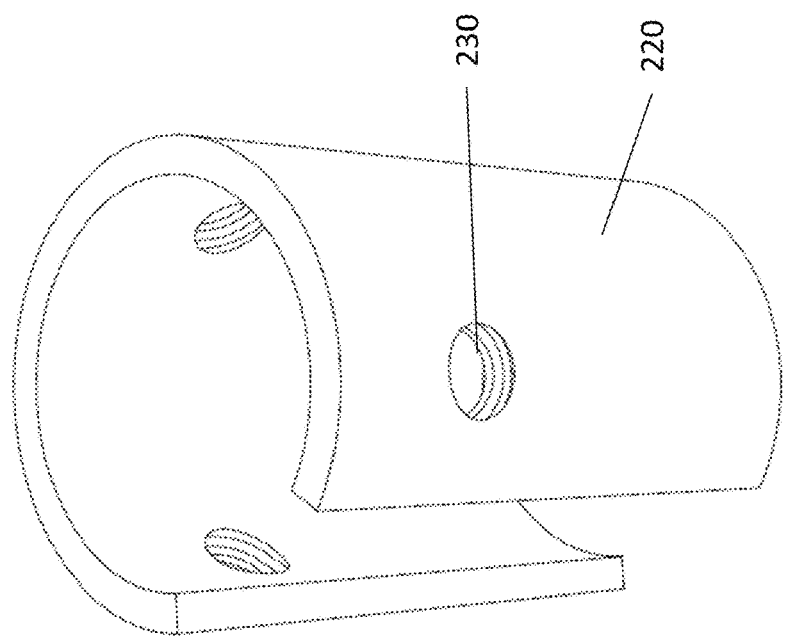
FIG. 5 shows a perspective view of the inner cylinder of a level fork protection sleeve according to an embodiment of the present disclosure.
Figure 4:
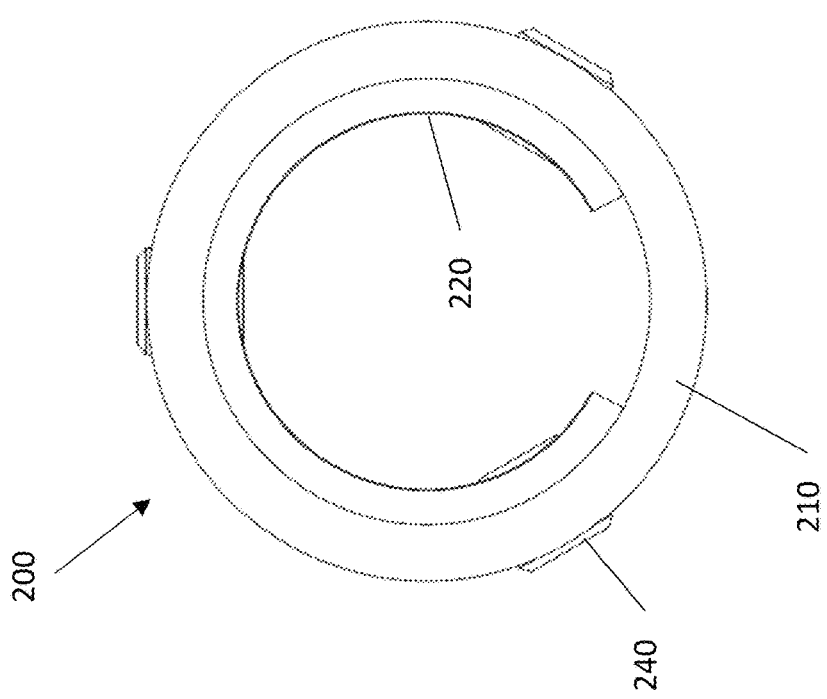
FIG. 4 shows a bottom view of the level fork protection sleeve according to an embodiment of the present disclosure.

FIGS. 2A and 2B show perspective views of a level fork protection sleeve 200 according to an embodiment of the present disclosure. The level fork protection sleeve 200 may include an outer hollow cylinder 210 and an inner hollow partial cylinder 220 disposed within the outer cylinder 210. The inner cylinder 220 may be defined by a major arc of at least 300 degrees.

The inner cylinder 220 may have an inner diameter sized to fit onto the shaft 130 of the limit level device 100. The outer cylinder 210 may have an inner diameter sized to fit onto the inner cylinder 220 and to fit over the vibrating member 110 of the limit level device 100 without contacting the vibrating member 110.

The inner cylinder 220 may have a length extending at least partially over the shaft 130 of the limit level device 100. The outer cylinder 210 may have a length extending completely over the inner cylinder 220 and also over the vibrating member 110 the limit level device 100. The length of the inner cylinder 220 may be less than that of the outer cylinder 210.

The inner cylinder 220 may be installed within the outer cylinder 210 and may be materially bonded to the outer cylinder 210. The material bonding of the inner cylinder to the outer cylinder may include adhesives such as epoxy, or may include welding. The inner cylinder 220 may be installed within the outer cylinder 210 such that the proximal end of the inner cylinder 220 is inset slightly at the proximal end of the outer cylinder 210. Such an inset of the inner cylinder 220 within the outer cylinder 210 may allow room for a welded joint between the inner cylinder 220 and the outer cylinder 210.

FIGS. 3A and 3B show the level fork protection sleeve 200 with the inner cylinder 210 installed within the outer cylinder 210. The proximal end of the inner cylinder 220 is slightly inset from the proximal end of the outer cylinder 210. A channel 250 may be formed by the minor arc of the inner cylinder 220 runs the length of the inner cylinder 220 and allows the ingress and egress of liquids and air when the level fork protection sleeve is installed on a limit level device that may be at least partially immersed in a liquid media.

As shown in FIGS. 2A and 2B, the level fork protection sleeve 200 may have a plurality of through-holes 230 disposed at the proximal ends of the two cylinders. The through-holes 230 may extend through both the outer cylinder 210 and the inner cylinder 220. The through-holes 230 may be spaced equidistantly around the circumference of the cylinders 210, 220, and each of the plurality of through-holes 230 may be tapped with threads to accept a set screw 240 within the respective through-hole 230.

The level fork protection sleeve may further include a plurality of set screws 240 threaded into the through-holes 230. The set screws 240 may be used for fixing the level fork protection sleeve 200 onto the shaft 130 of a vibronic limit level device 100. Such a fixing with set screws 240 allows a removeable attachment of the level fork protection sleeve 200 onto the vibronic limit level device 100.

The material of the first cylinder 210 and of the second cylinder 220 may be stainless steel, aluminum, or an injection-molded plastic.

What is claimed:

1. A level fork protection sleeve, comprising:
an outer cylinder defined by an inner diameter, an outer diameter, and a length, the outer cylinder having a first end and a second end;
a partial inner cylinder defined by a major arc of at least 300 degrees and further defined by an inner diameter, an outer diameter, and a length, the inner cylinder having a first end and a second end; and
a plurality of set-screws,
wherein the inner diameter of the inner cylinder is greater than an outer diameter of a shaft of a vibronic limit-level device, and the inner diameter of the outer cylinder is greater than the outer diameter of the inner cylinder,
wherein the length of the outer cylinder is greater than the length of the inner cylinder,
wherein the inner cylinder is disposed within the outer cylinder such that an axis of the inner cylinder coincides with an axis of the outer cylinder and such that the first end of the inner cylinder is disposed at the first end of the outer cylinder or such that the first end of the inner cylinder is inset from the first end of the outer cylinder,
wherein the outer cylinder and the inner cylinder are materially bonded together,
wherein a plurality of though-holes are disposed along a circumference of the outer cylinder at the first end of the outer cylinder, each of the plurality of through-holes extending through the outer cylinder and the inner cylinder disposed within the outer cylinder,
wherein each of the plurality of through-holes is tapped with threads, and each of the plurality of set-screws is disposed in a corresponding through-hole, and
wherein the sleeve is embodied to fit over a vibrating member of a vibronic limit level device such that the inner cylinder fits snugly over the shaft of the vibronic limit-level device, the plurality of set-screws affix the sleeve to the shaft, the inner cylinder does not extend over the vibrating member, and the outer cylinder extends over the vibrating member without contacting the vibrating member.

2. The level fork protection sleeve of claim 1,
wherein the first cylinder and the second cylinder are stainless steel, and
wherein the material bonding is a welding of the second cylinder to the first cylinder.

3. The level fork protection sleeve of claim 1,
wherein the first end of the inner cylinder is inset from the first end of the outer cylinder, the level fork protection sleeve further comprising:
a weld joint at the first end of the inner cylinder welding the inner cylinder to the outer cylinder.

4. The level fork protection sleeve of claim 1,
wherein the first end of the inner cylinder is disposed at the first end of the outer cylinder.

* * * * *